(12) United States Patent
Akiyama et al.

(10) Patent No.: US 7,016,298 B2
(45) Date of Patent: Mar. 21, 2006

(54) SIGNAL TRANSMISSION/RECEPTION SYSTEM OF ORTHOGONAL FREQUENCY DIVISION MULTIPLEXING

(75) Inventors: Toshiyuki Akiyama, Tokorozawa (JP); Nobuo Tsukamoto, Akishima (JP); Tetsuomi Ikeda, Machida (JP); Satoshi Okabe, Yokohama (JP)

(73) Assignees: Hitachi Kokusai Electric Inc., Tokyo (JP); Nippon Hoso Kyokai, Tokyo (JP)

( * ) Notice: Subject to any disclaimer, the term of this patent is extended or adjusted under 35 U.S.C. 154(b) by 693 days.

(21) Appl. No.: 09/884,026

(22) Filed: Jun. 20, 2001

(65) Prior Publication Data

US 2001/0055295 A1 Dec. 27, 2001

(30) Foreign Application Priority Data

Jun. 23, 2000 (JP) ............................. 2000-189870

(51) Int. Cl.
*H04J 11/00* (2006.01)
(52) U.S. Cl. ...................................... 370/206; 370/482
(58) Field of Classification Search ................ 370/203, 370/204, 206, 208, 210, 303, 308, 309, 320, 370/322–324, 281, 295, 480, 482; 375/303, 375/308, 309, 320, 322–324

See application file for complete search history.

(56) References Cited

U.S. PATENT DOCUMENTS 5,107,504 A * 4/1992 Nakamura et al. .......... 714/778
5,771,224 A * 6/1998 Seki et al. .................. 370/206

FOREIGN PATENT DOCUMENTS

| EP | 0929165 | 7/1999 |
|----|---------|--------|
| EP | 0942547 | 9/1999 |
| JP | 9130440 | 5/1997 |
| JP | 10126374 | 5/1998 |
| JP | 200092022 | 3/2000 |

OTHER PUBLICATIONS

"The Journal of the Institute of Image Information and Television Engineers", vol. 52, No. 11, 1998, pp. 1539-1545 and pp. 1658-1665.

* cited by examiner

Primary Examiner—Chau Nguyen
Assistant Examiner—Ian N. Moore
(74) Attorney, Agent, or Firm—Mattingly, Stanger, Malur & Brundidge, P.C.

(57) ABSTRACT

A transmission apparatus of orthogonal frequency division multiplexing for multiplexing a plurality of carriers orthogonal to one another to transmit a modulated signal. The transmission apparatus includes a first modulator for outputting a code modulated in accordance a modulation scheme which can be applied with a synchronous detection for demodulation, a second modulator for outputting a code modulated in accordance with a modulation scheme different from the modulation scheme associated with the first modulator, and a distributing circuit for distributing the codes modulated by the first and second modulators to a plurality of carriers. The distributing circuit distributes the code modulated by the second modulator to all or some of carriers existing within a predetermined number of columns from at least one of both end regions of a signal transmission frequency band, and the code modulated by the first modulator to the remaining carriers.

18 Claims, 11 Drawing Sheets

SIGNAL TRANSMISSION/RECEPTION SYSTEM OF ORTHOGONAL FREQUENCY DIVISION MULTIPLEXING

BACKGROUND OF THE INVENTION

The present invention relates to a signal transmission/reception system of orthogonal frequency division multiplexing, and more particularly, to a signal transmission/reception system of orthogonal frequency division multiplexing based on synchronous modulation such as a 64 QAM (Quadrature Amplitude Modulation) scheme.

In recent years, in the field of radio devices, the OFDM scheme has been in the limelight as a modulation scheme immune to multipath fading. A large number of applied studies on the OFDM are now under progress in the fields of next-generation television broadcasting, FPU (Field Pickup Unit), radio LAN and so on in many countries including European countries and Japan.

Here, the OFDM (Orthogonal Frequency Division Multiplexing) scheme is an acronym for an orthogonal frequency division multiplexing modulation in which information codes are transmitted by using a plurality of carriers orthogonal to one another. The trends of developments in OFDM-based UHF-band terrestrial digital broadcasting and associated schemes are disclosed in detail in "The Journal of the Institute of Image Information and Television Engineers," Vol. 52, No.11, pp. 1539–1545 and pp. 1658–1665 (1998).

As an example of the prior art, the UHF-band terrestrial digital broadcasting system in Japan will be described below. It should be noted however that this scheme involves an extremely complicated configuration, so that the following description will be made on the system which is simplified to such an extent that is required for understanding the present invention.

Beginning with description on the structure of a carrier in this broadcasting system, as illustrated in FIG. 6, this system uses a total of approximately 1,400 carriers within a frequency band W which is divided into 13 segments such that information codes of up to three channels (three layers) can be simultaneously transmitted. In a case that the information codes for three channels are transmitted, for example, about 470 carriers are used for each channel.

In this event, the number of segments and a modulation scheme used in each layer can be freely selected from several modes as shown in the above-mentioned documents. Within such selectable modes, a mode in which carriers of all segments are modulated in accordance with the same synchronous modulation scheme such as 64 QAM can be applied as it is to other transmitters such as FPU (Field Pickup Unit).

Now, referring to FIG. 7, a prior art OFDM system based on the synchronous modulation as mentioned will be described below in greater detail for an example in which carriers of all segments are modulated in accordance with the same 64 QAM scheme to transmit information codes on one layer. FIG. 7 is a diagram representing the structure of the carriers of segments which are modulated in accordance with the synchronous modulation scheme, and only shows a low end region of the frequency band W in FIG. 6.

In a mode which uses all segments for transmission of information codes on one layer, it may be thought that a similar structure is repeated over the entire band.

In FIG. 7, the horizontal direction represents the frequency; the vertical direction represents the lapse of time; and squares "☐" arrayed in the horizontal and vertical directions each represent one carrier. Thus, one column of squares "☐" arranged in the horizontal direction within the whole frequency band represents one symbol which forms part of an OFDM signal.

Further, a carrier "☐" with "SP" denoted within the square represents the position at which a carrier is inserted for a pilot signal used for reproducing a reference signal (a reference for an amplitude and phase) during demodulation, while a carrier without any notation within the square represents a carrier for a signal of an information code modulated in accordance with the 64 QAM scheme. As can be seen in FIG. 7, since the pilot signals are scattered in the frequency direction and the time direction, they are designated as "SP" (Scattered Pilot).

It should be noted that FIG. 7 merely indicates the positioning of the pilot signals SP's in a schematic form and omits a TMCC (Transmission and Multiplexing Configuration Control) carrier which is generally included for transmitting control signals.

Also, in the actual terrestrial digital broadcasting system, every third carrier columns, in the direction of the frequency axis, have SP's arranged in the direction of the time axis, whereas the structure shown in FIG. 7 is modified such that every fifth carrier columns have SP's. This modification is made for the ease of understanding the description of the present invention, later given, and there is essentially no change in contents.

Then, a signal in accordance with the 64 QAM scheme is indicated by any of 64 signal points represented by broken line circles on an orthogonal coordinate plane in FIG. 8, where each signal point is corresponded to a sequence of codes comprised of six bits, different from one another. For example, a signal point b on the I-Q complex plane in FIG. 8 is corresponded to a code "011111".

The modulation processing in accordance with the 64 QAM scheme involves dividing a sequence of input information codes in units of six bits, assigning each of the divided 6-bit codes to any one of the 64 signal points on the I-Q complex plane. Each of the 6-bit codes is converted to a signal corresponding to the coordinate of I-Q complex plane representing a signal point indicated by a solid line circle "○" in FIG. 8, and outputting the converted signal. Then, a modulated signal indicative of the code is outputted.

On the other hand, the transmission signal is affected by noise and other interference during a transmission process and distorted. For this reason, for example, a solid line circle "○" representative of a signal b, when transmitted, in FIG. 8 will move to a position indicated by a cross "X" representative of a signal point b' when received.

The demodulation processing in accordance with the 64 QAM scheme involves selecting the signal point "b" closest to the signal point b' for the received signal represented by the cross "X", from 64 QAM signal points indicated by broken line circles, and outputting a 6-bit code corresponding to the selected signal point. Therefore, the demodulation processing requires the knowledge of the correct signal point position indicated by the broken line circle associated with the received signal.

The reproduction of a correct signal position only requires to find, for example, the direction and magnitude of a reference signal vector which represents the correct position of a coordinate point "a" on the signal space in FIG. 8 which serves as a reference. The direction and magnitude of the reference signal vector for a received signal, however, have been affected by multipath and so on, which may occur in the transmission system, causing the phase to rotate and the amplitude to change as shown in FIG. 9. On the reception side, the reference signal vector must be reproduced based on a pilot signal SP for each carrier. For a carrier without pilot signal SP, the reference signal vector therefor is produced based on pilot signals of neighboring carriers.

Here, while the phase and magnitude of the reference signal vector change every time or from one carrier to another, as described above, the manner of changing is generally expressed by a smooth curve and has a remarkable correlation in the time direction and in the frequency direction. For this reason, the reference signal vector for a modulated signal A of an arbitrary carrier of an arbitrary symbol in FIG. 7 can be readily found by interpolation of a plurality of sporadically transmitted SP signals. FIG. 7 shows exemplary positions of SP signals which facilitate efficient interpolation.

Though not particularly defined for the terrestrial digital broadcasting system, a method of reproducing the reference signal vector from a signal having the carrier structure shown in FIG. 7 may be implemented, for example, using a circuit illustrated in FIG. 10.

FIG. 10 illustrates an exemplary circuit for use in reproducing a reference signal vector on the reception side in an OFDM-based transmission system. In the illustrated circuit, a received signal is first outputted from an FFT (Fast Fourier Transform) circuit 30, and commonly inputted to a time direction interpolation circuit 31 and a delay circuit 32.

Then, the time direction interpolation circuit 31 first extracts SP signals from the received signal, and filters every carrier column including SP's in the time direction, as indicated by hatchings in FIG. 11, using a low pass filter (LPF) having a predetermined number of taps, to output the resulting signal as a reference signal vector signal interpolated in the time direction. Though the digital LPF is not illustrated, it is included in the interpolation circuit 31. FIG. 11 is a diagram which shows in greater detail the carrier structure of a segment modulated in accordance with the synchronous modulation scheme, in the same manner as FIG. 7. In the following, a carrier in which SP is located is designated as the "SP carrier".

Next, FIG. 12 is a diagram schematically showing a method of determining a reference signal vector for a carrier without SP through the foregoing interpolation of SP's in the time direction. Such carriers are indicated by a one-dot chain line 22 in FIG. 7. In FIG. 12, the horizontal axis represents a time axis on which the scaling is marked for each symbol, and a vertical line with a circle added at the top represents a signal vector for a received SP.

Then, reference signal vector signals existing, for example, in a period from the receipt of certain SP, for example, SP1 to the receipt of SP2 are found by interpolation using vector signals for a plurality of SP's at positions temporally preceding to and subsequent to these symbols by means of an LPF having a fixed number of taps.

Therefore, by the interpolation of SP's in the time direction, reference signal vectors are calculated for all carriers on the columns indicated by hatchings in FIG. 11. In this event, the LPF-based operation requires signals of a number of symbols equal to the number of taps, and interpolated signals are outputted with a delay of a number of symbols corresponding to approximately one half of the number of taps. Therefore, the delay circuit 32 is provided such that the timing of the interpolated signal matches the timing of the received signal.

On the other hand, a reference signal vector for a modulated signal A on a carrier in a column in which no SP is located is found by interpolating reference signal vectors for SP carriers in a column indicated by hatchings in the frequency direction. For this reason, an output signal of the time direction interpolation circuit 31 is further inputted to the frequency direction interpolation circuit 33 which reproduces a reference signal vector signal through interpolation in the frequency direction.

FIG. 13 is a diagram schematically showing a frequency direction SP interpolation method for symbols along a one-dot chain line shown in FIG. 11. In FIG. 13, the horizontal axis represents the frequency with the scaling marked for each carrier position, and bold vertical arrows represents reference signal vectors W(1), W(5+1), W(2×5+1), . . . , for carriers which are found through the interpolation in the time axis direction in FIG. 12, i.e., the carriers indicated by hatchings in FIG. 11, where numbers in parenthesis represent carrier numbers.

In FIG. 13, a reference signal vector for a carrier position A without bold arrow is calculated in the following manner.

Specifically, in FIG. 13, assuming that the magnitude of a vector for a carrier without bold arrow is zero, and signals W(1), 0, . . . , 0, W(5+1), 0, . . . 0, W(2×5+1), . . . are processed, for example, by a general digital LPF having 23 taps to calculate smoothly interpolated signals as indicated by a broken line. Though the digital LPF is not illustrated, it is contained in the SP interpolation circuit 33.

It is therefore possible to correct a displaced signal point position in a manner shown in FIG. 9 to a correct position shown in FIG. 8 to demodulate a correct information code by inputting the reference signal vector signal reproduced by the frequency-direction interpolation circuit 33 to a 64 QAM demodulator circuit 34 together with the received signal which is delayed by the delay circuit 32 by the number of symbols equal to approximately one half of the number of taps in the LPF to correct the phase and amplitude of the received signal.

SUMMARY OF THE INVENTION

In the foregoing prior art, it does not take into consideration the number of carriers required for the SP interpolation in the frequency direction, so that distortion still remains in a reproduced reference signal vector.

Specifically, reference signal vectors are correctly reproduced through the interpolation in the frequency direction on condition that a predetermined number of carriers or more exist preceding to and subsequent to a carrier of interest (on the low frequency side and the high frequency side). However, the aforementioned problem arises since a required number of carriers are not always available.

The SP interpolation calculation in the frequency direction employs an LPF comprised of a digital filter having a plurality of taps. Therefore, assuming that a digital filter having 23 taps, for example, is used for finding an interpolated value of an arbitrary carrier number A, eleven carriers are required preceding to and subsequent to the carrier number A, as shown in FIG. 13.

The inventors of this application observed that operations involved in the interpolation implies the following problems.

Specifically, for calculating an interpolated value for a carrier existing at the center of a carrier band W, a required number of carriers, for example, 11 carriers as mentioned above, are available preceding to and subsequent to the carrier of interest, so that there is no problem. However, near an end of the band W, the required number of carriers are not available for the calculation.

As illustrated in FIG. 14, near an end of a band, no carrier exists on one side of the position of a carrier for which an interpolated value is to be found, on the lower frequency side in FIG. 14. In other words, while reference signal vectors indicated by bold solid line and broken line arrows are required for performing correct SP interpolation, the reference signal vectors indicated by the broken line arrows are out of band and therefore no carriers actually exist, so that a correct interpolated value cannot be calculated due to an insufficient number of reference vectors.

FIG. 15 shows the magnitude of a distortion vector in dB, i.e., a difference between a correct reference signal vector, which should be essentially provided, and an actually interpolated value in the situation mentioned above. In FIG. 15, the scaling is marked for carrier positions on the frequency axis, and the positions of SP carriers are indicated by circles "○" on the frequency axis.

It can be seen from FIG. 15 that a distortion of a reference vector value found through the interpolation in the frequency direction with respect to a correct reference signal vector suddenly increases as the carrier is closer to the end of the band within a range C which includes the number of carriers equal to approximately one half of the number of taps of a digital LPF used in the interpolation in the frequency direction.

It is also contemplated that the magnitude of distortion vector representing a level difference between the reference signal vector value obtained by interpolation and the correct reference signal vector value exceeding $\frac{1}{7}$, i.e. more than −15 dB, of the magnitude of the correct reference signal vector would be produced in a carrier between an SP carrier SPa at the extreme end and the next SP carrier SPb depending on conditions of multipath (a delayed wave) possibly introduced in the transmission system. The distortion produced in this situation includes a component which rotates the reference signal vector, and a component which varies the magnitude. Anyway, the distortion appearing in the reference signal vector exerts significantly large influences as described below.

For example, FIG. 16 shows how signal points are shifted due to a distortion (as shown in FIG. 15) of approximately $\frac{1}{7}$ (about −15 dB) of the magnitude of a reference signal vector obtained by interpolation, wherein a signal point calculated with a reference signal vector found through interpolation using an insufficient number of carriers is represented by a solid line circle, while a signal point which should be calculated with a correct reference signal vector is represented by a broken line circle.

As is apparent from FIG. 16, even if a signal is received at a position indicated by a cross "X" near a correct signal point b, the signal would be erroneously demodulated as being taken for a neighboring signal point c which is the closest to the cross, so that erroneous codes would be generated with an extremely high frequency.

For example, in an OFDM system using the 64 QAM scheme for modulation and 1,400 carriers, even if the number of carriers, which would cause large distortions (In FIG. 15, two large distortions over than −20 dB are generated.) in a reference signal vector at an end of a band, is approximately six, for example even in the total of both sides, a code error rate for the entire system would reach 6/(1400×6), i.e., approximately 7×10⁻⁴ or higher. It should be noted that the six carriers at the end have only one erroneous bit within 6-bit codes corresponding to signal points. In the above expression of code error rate, the numerator of six represents total number of error bits in one symbol, and the number of six in the denominator represents the number of bits for each carrier. That is, the denominator 1400×6 represents total number of bits of one symbol including 1400 carriers.

Such a high code error rate cannot at all support a system, particularly, if the system employs an error correction using Viterbi decoding or the like. This is because a system employing such an error correction generally requires the performance for the code error rate equal to or lower than approximately 10⁻³ before error correcting.

The code error due to the lack of carriers occurs when multipath exists, even if any noise is not included in a received signal. Therefore, this means that the reduction of the code error rate is limited to a certain value even if a receiving condition is improved.

In this event, whether a large distortion is produced in a reproduced reference signal vector depends on the magnitude or the delay time of a multipath component introduced in the transmission system, so that it is certain that such a distortion is not always produced. Nevertheless, the prior art still remains as a system which is quite sensitive to a change in the environment of the transmission system.

A possible method of addressing this problem would involve estimating the phase and magnitude of a reference signal vector at a carrier position at which no SP carrier exists out of a band, from the phase and magnitude of a reference signal vector for an SP carrier near an end of the band, and extrapolating a reference signal vector at that carrier position to reduce a distortion in waveform possibly occurring in an LPF.

Though details are omitted, a reduction in distortion through the extrapolation is limitedly achieved only in particular conditions. In addition, the extrapolation, which requires a circuit of a scale as large as a 64 QAM demodulator circuit, will cause another problem.

The present invention provides an OFDM-based transmission apparatus in accordance with the synchronous modulation which is immune to a change in transmission environment, and does not involve an increase in circuit scale.

A transmission apparatus of orthogonal frequency division multiplexing and a transmitter of a transmission/reception system of orthogonal frequency division multiplexing according to the present invention are transmission apparatus of orthogonal frequency division multiplexing for multiplexing a plurality of carriers orthogonal to one another for transmitting a signal. The transmission apparatus includes a transmission side and a reception side. The transmission side includes an input terminal to which information codes are applied; first modulator coupled with the input terminal for outputting first signals modulated in accordance with a modulation scheme which can be applied with a synchronous detection for demodulation in said reception side, a second modulator for outputting a code modulated in accordance with a modulation scheme different from the modulation scheme associated with the first modulator, and a transmission unit including a distributing circuit coupled with said first and second modulators for distributing the first and second signals modulated by the first and second modulator to a plurality of predetermined carriers. The distributing circuit distributes the second signals modulated by the second modulator to all or some of carriers existing within a predetermined number of columns from at least one of both end regions of a signal transmission frequency band, and the first signals modulated by the first modulator to the remaining carriers, and outputs the modulated signals. In one embodiment of the present invention, employed as the modulation scheme for the second modulator circuit may be a differential modulation scheme or a modulation scheme which can be applied with a synchronous detection having a smaller number of multilevel than a modulation scheme for the first modulator circuit.

Also, a transmission apparatus of orthogonal frequency division multiplexing for transmitting a signal on which a plurality of carriers orthogonal to one another are multiplexed, and a transmitter in a transmission/reception system of orthogonal frequency division multiplexing, according to the present invention, comprise a first error correction coding circuit for converting a first code to a first error correction code, a second error correction coding circuit for converting a second code to a second error correction code which has error correcting performance higher than the first error correction code, a first modulator for outputting a signal modulated with the first error correction code in accordance with a modulation scheme which can be applied with a synchronous detection for demodulation, a second modulator for outputting a signal modulated in accordance with a predetermined modulation scheme with the first error correction code, and a distributing circuit for distributing the signal modulated by the first modulator and the signal modulated by the second modulator to a plurality of predetermined carriers. The distributing circuit distributes the signal modulated by the second modulator to all or some of carriers existing within a predetermined number of columns from at least one of both end regions of a signal transmission frequency band, and assigning the signal modulated by the first modulator circuit to the remaining carriers.

Advantageously, according to the present invention, it is possible to configure a satisfactory OFDM-based transmission apparatus, transmitting information codes using a plurality of carriers, which is immune to a change in environment of a transmission system.

That is, according to the present invention, by using differential modulation scheme, which does not require a reference signal vector in modulation, as a modulation scheme for the carriers in both ends of the signal transmission band where a large distortion may occur, the information codes assigned to the carriers in those ends of the band are not affected by the distortion of the reference signal vector, and the information codes can be reproduced in good quality by the demodulation. In such case, the system requires a demodulator for demodulating the modulated signal in differential modulation scheme. However, since the demodulator circuit adapted to the differential modulation scheme does not require reproduction of reference signal vectors, as is the case with a demodulator circuit adapted to the synchronous modulation scheme, an increase in circuit scale is smaller than the circuit scale in a case that the extrapolation circuit for obtaining the reference signal vector by the extrapolation, so that, according to this embodiment, an increase in circuit scale can be limited.

Also, for demodulating carriers in both ends of the band of the signal transmission, the transmission apparatus of the present invention requires a demodulator circuit adapted to a modulation scheme different from a demodulator circuit adapted to a modulation scheme for carriers in a central region of the band. However, by modulating the both ends at the band in accordance with the same synchronous modulation scheme as same as the carriers intermediate of the transmission band, a common circuit can be shared only by changing signal point positioning for the demodulator circuit, so that an increase in circuit scale can be substantially ignored.

Further, as can be seen also from FIG. 15, distortions in reference signal vectors calculated through interpolation in a carrier direction are such that reference signal vectors for carriers existing between the SP carrier at one extreme end of the band and the second SP carrier exhibit the largest distortions, and distortions are at an unignorable level in reference signal vectors for carriers within M columns in an end region of the band, wherein M is equal to approximately one half of the number of taps 2M+1 of a digital LPF for use in the interpolation in the carrier direction.

However, in one embodiment of the present invention, carriers existing in this region, which have particularly larger distortions, are modulated in accordance with the differential modulation scheme that is free from the influence of distortions in reference signal vectors, or in accordance with a synchronous modulation scheme having a low number of multilevel, which is less susceptible to the distortions, and further corrected using an error correction code having high error correction performance, thereby making it possible to configure an OFDM-based modulation apparatus which employs the modulation scheme that features a low code error rate.

DESCRIPTION OF THE EMBODIMENTS

A transmission apparatus of orthogonal frequency division multiplexing according to the present invention will hereinafter be described in detail in connection with illustrated embodiments.

Figure 1:
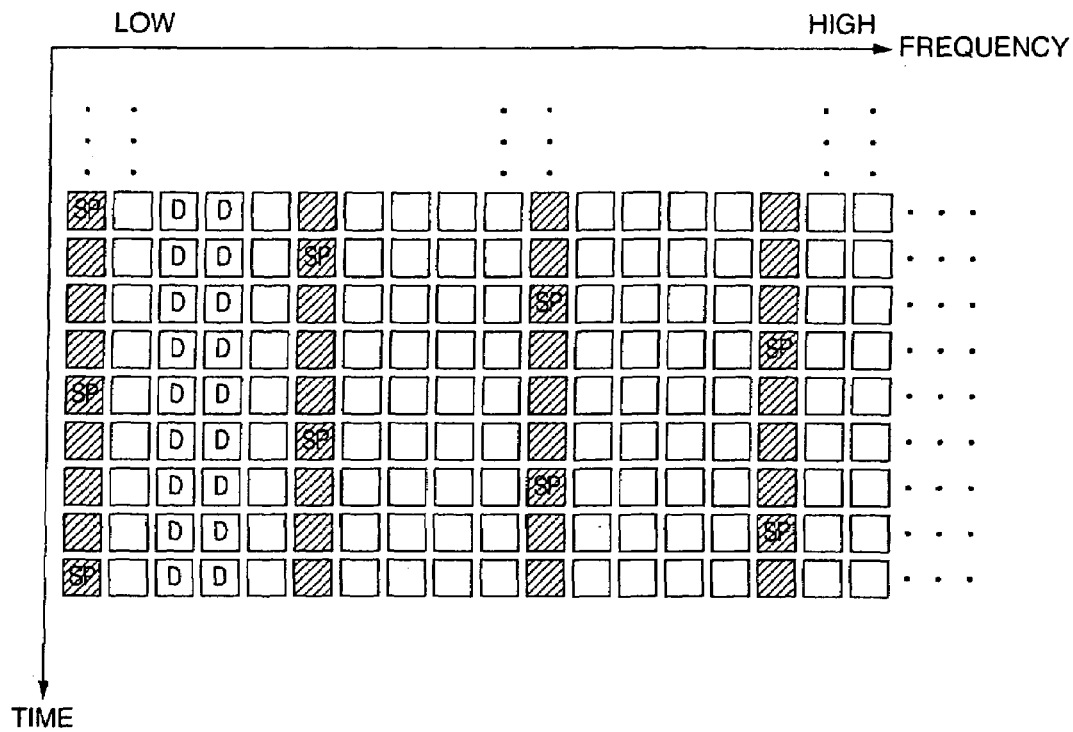
FIG. 1 is an explanatory diagram showing exemplary positioning of carriers in an embodiment of a transmission apparatus of orthogonal frequency division multiplexing according to the present invention.
Figure 7:
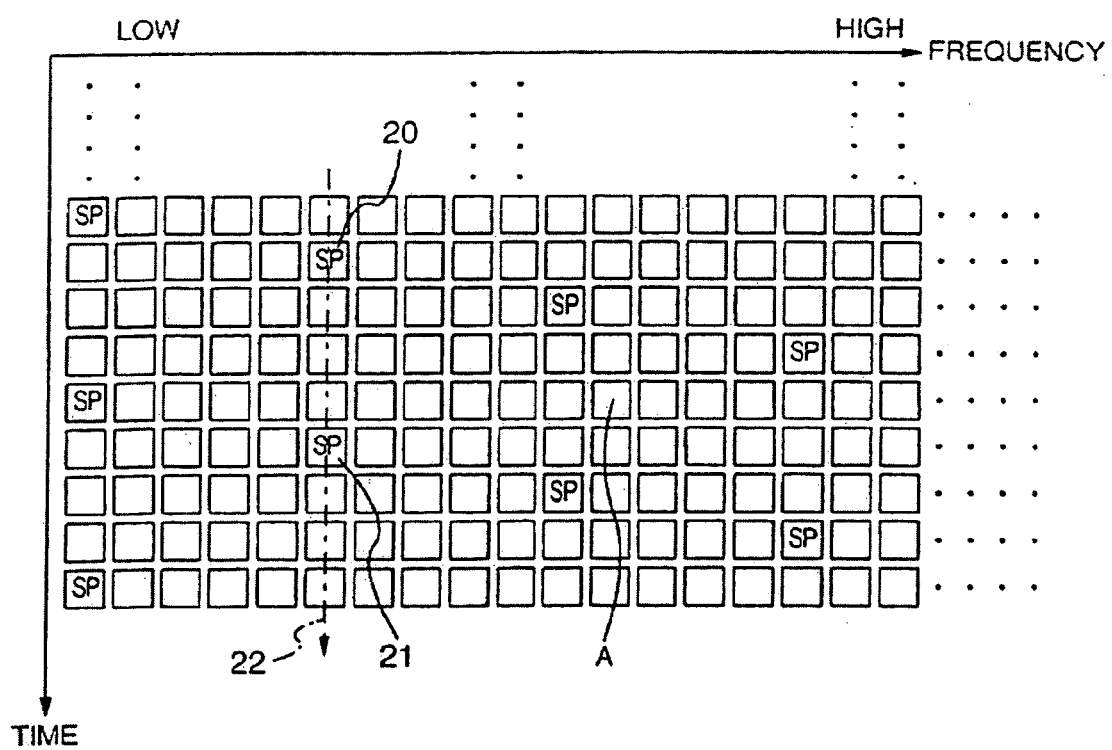
FIG. 7 is an explanatory diagram showing exemplary positioning of carriers employed in a terestrial digital broadcasting scheme.

FIG. 1 shows an exemplary structure of carriers in a first embodiment of the present invention, wherein the horizontal direction represents the frequency, and the vertical direction represents the lapse of time, as is the case with FIG. 7. Squares "□" arrayed in the horizontal and vertical directions each represent one carrier. Thus, one row of carriers "□" arranged in the lateral direction represents one symbol which forms part of an OFDM signal.

Further, a carrier "□" with "SP" denoted within the square represents the position of a carrier for a pilot signal which is used for reproducing a reference signal during demodulation, while a carrier without any notation within the square represents the position of a carrier for a signal modulated in accordance with the 64 QAM scheme, also as is the case with FIG. 7.

The interval between SP carriers in the first embodiment of FIG. 1 may be any arbitrary number of columns of carriers, including three, as in the terrestrial digital broadcasting system.

The embodiment of FIG. 1 differs from the prior art shown in FIG. 7 in that some of carriers "□" near both end regions of a band are replaced with carriers "□" with a reference letter D denoted therein. FIG. 1 only shows an end region on the lower frequency side of the band.

In the following, a carrier represented by a symbol "□" with the reference letter D denoted therein will be called the "D-carrier", while a carrier represented by a symbol "□" shown as blank without any letter denoted therein, except for these D-carriers and SP carriers, will be called the "C-carrier".

The transmission apparatus of this embodiment is configured to modulate, for transmission, information codes assigned to the D-carriers in both ends regions of the transmission band in accordance with a differential modulation scheme which does not require reference signal vectors for demodulation such as DBPSK (Differential Binary Phase Shift Keying), DQPSK (Differential Quadrature Phase Shift Keying), 8 DPSK or 16 DAPSK (Differential Amplitude Phase Shift Keying) scheme, rather than the synchronous modulation scheme such as the 64 QAM scheme. Since the differential modulation scheme does not use pilot signals for demodulation, information codes are not affected by distortions in reference signal vectors.

Figure 12:
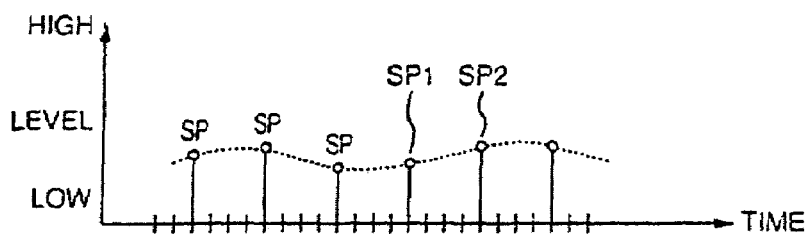
FIG. 12 is an explanatory diagram schematically showing interpolation of a carrier in a time direction.
Figure 13:
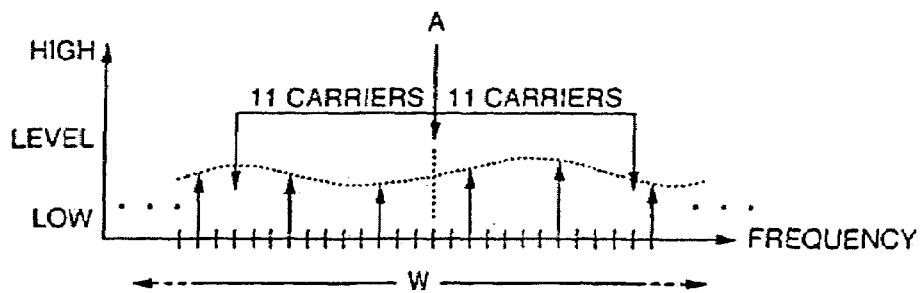
FIG. 13 is an explanatory diagram schematically showing interpolation of a carrier in a frequency direction.
Figure 14:
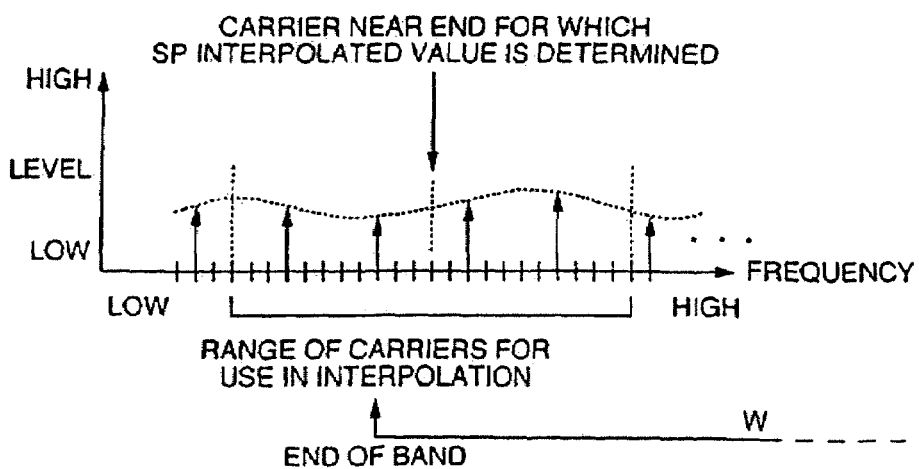
FIG. 14 is an explanatory diagram showing a problem in the interpolation of a carrier in the frequency direction.

On the other hand, the transmission apparatus of this embodiment is configured to modulate, for transmission, information codes assigned to the C-carriers in accordance with a synchronous modulation scheme such as the 64 QAM scheme, as mentioned above, and to reproduce reference signal vectors for use in demodulation of carriers of this synchronous modulation scheme through the interpolation as is the case with FIGS. 12 and 13.

Figure 15:
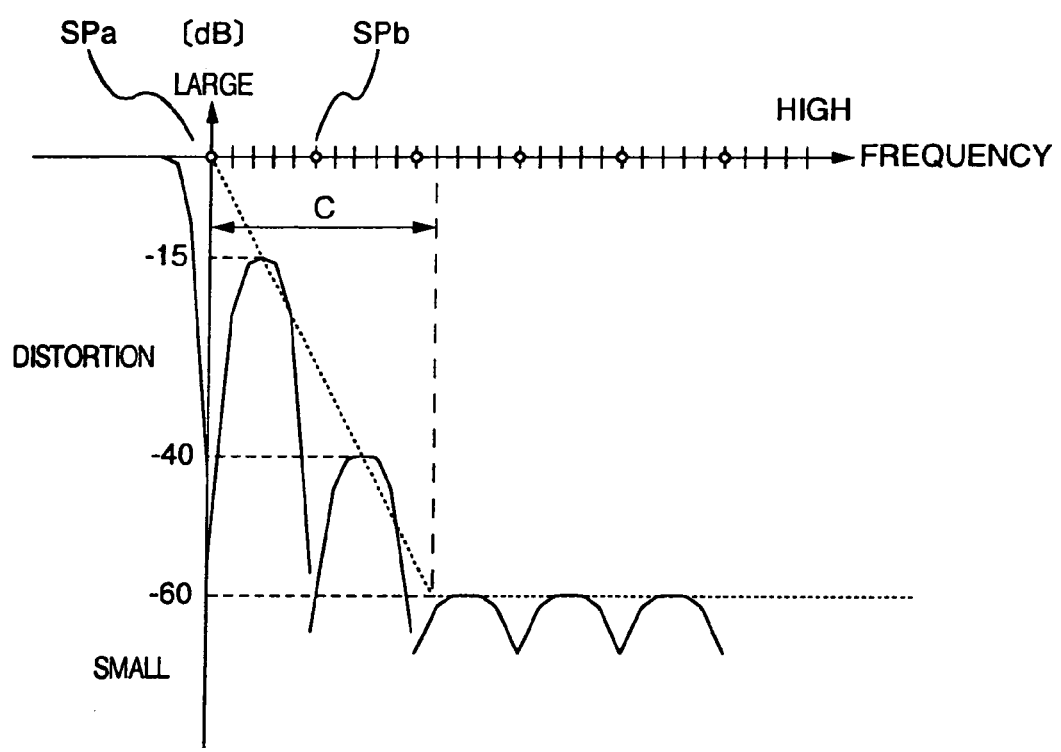
FIG. 15 is a characteristic diagram showing an exemplary amount of distortion caused by the interpolation of carriers in the frequency direction.
Figure 16:
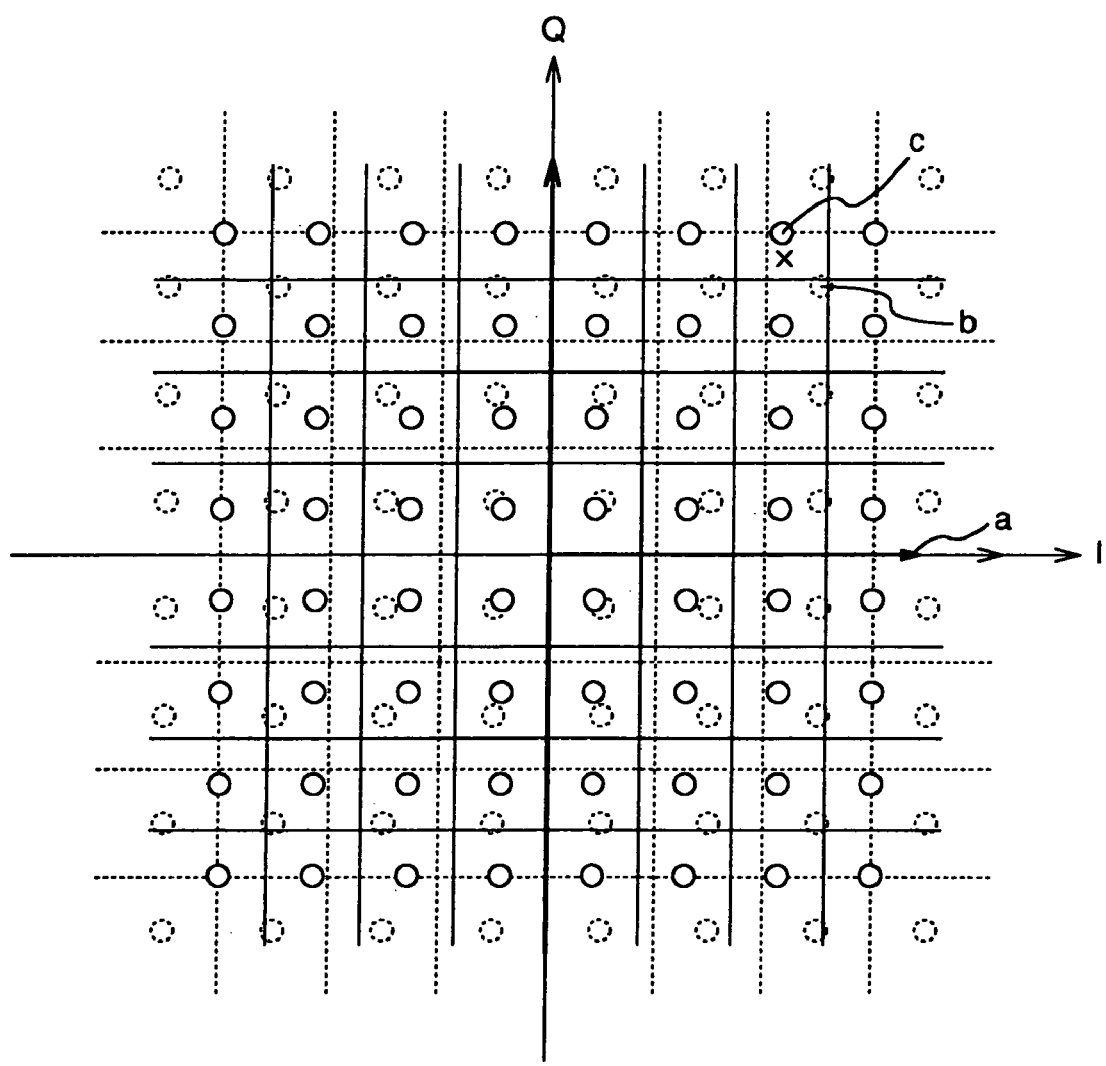
FIG. 16 is an explanatory diagram showing the position of a signal point when a large distortion is produced.

Therefore, in carrier mapping for the embodiment of FIG. 1, carries near the ends of the band, where distortions are particularly larger (peak distortion points) in a characteristic diagram of FIG. 15, are removed from carrier positions modulated by the synchronous modulation scheme. Instead, D-carriers modulated by the differential modulation scheme are assigned. As shown in FIG. 15, since the SP carriers adjacent to SPa and SPb carriers have small distortion, these carriers still remain as C-carrier. As a result, as compared with the prior art which includes information codes decoded from carriers using largely distorted reference signal vectors in both ends regions of band, this embodiment can reduce a code error rate of information codes decoded from carriers modulated in accordance with the synchronous modulation scheme.

Also, since the information codes assigned to the D-carriers modulated in accordance with the differential modulation scheme, which does not use the pilot signal in demodulation, do not require reference signal vectors for their demodulation, a large distortion in the reference signal vector, if any, would not at all affect the error rate of decoded information codes, thereby making it possible to readily decode satisfactory information codes.

In this event, information codes to be transmitted by the D-carriers may be some of information codes to be transmitted by C-carriers, for example, some codes such as compressed image codes. Alternatively, other information codes independent of the information codes transmitted by the C-carriers, may be transmitted, such as an audio signal and a signal for controlling a pan head of a camera. In an extreme case, no information code may be transmitted by the D-carriers.

Therefore, the transmission apparatus according to this embodiment can sufficiently reduce the code error rate of information codes which are decoded from carriers modulated in accordance with the synchronous modulation scheme. Moreover, in this event, since a demodulator circuit for the modulated signal modulated by the differential modulation scheme need not reproduce reference signal vectors as is the case with a demodulator circuit for the modulated signal modulated by the synchronous modulation scheme, an increase in circuit scale is smaller than the circuit scale required for the extrapolation, so that, according to this embodiment, an increase in circuit scale can be limited.

Figure 2:
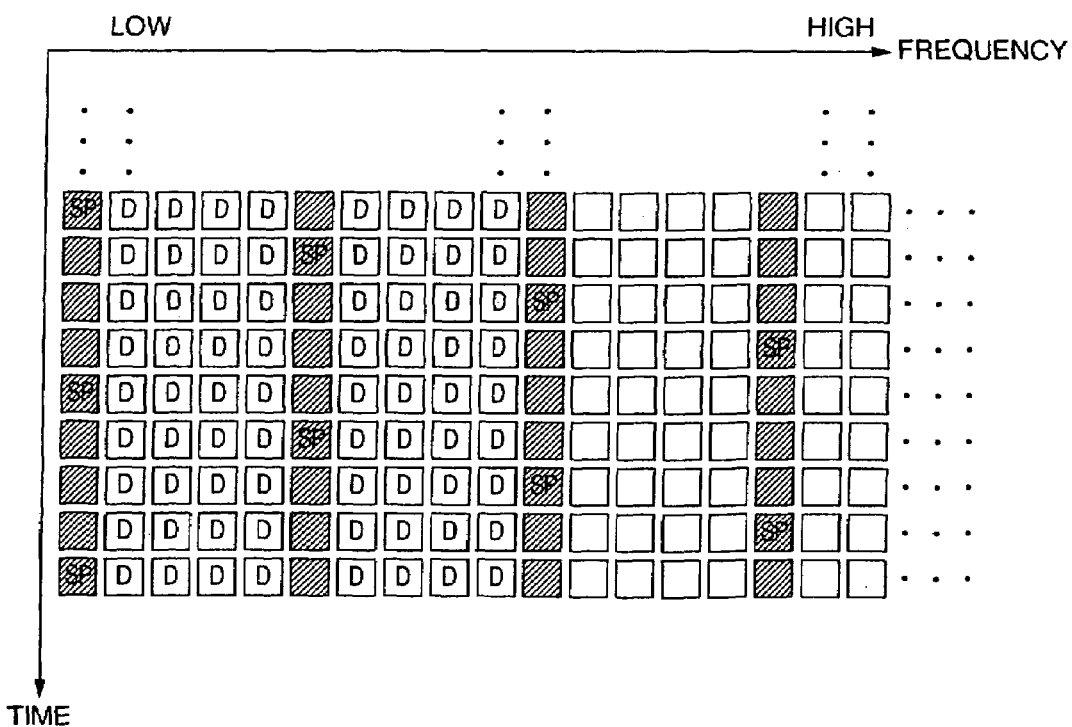
FIG. 2 is an explanatory diagram showing another exemplary positioning of carriers in an embodiment of a transmission apparatus of orthogonal frequency division multiplexing according to the present invention.

Instead of the positioning for the D-carriers shown in FIG. 1, an arbitrary number of data carriers continuous for a predetermined number M from the end of the band determined by the number of taps 2M+1 of a used interpolation filter may be entirely set as the D-carriers, as shown in FIG. 2 (M is a positive integer).

Figure 3:
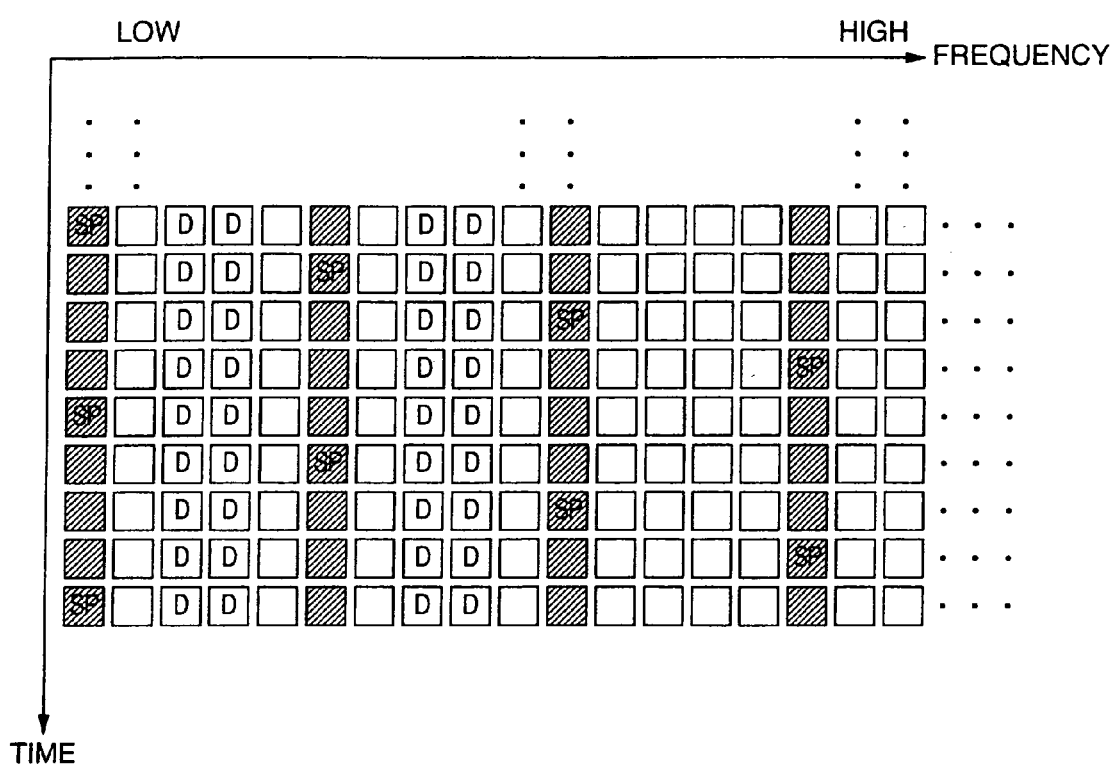
FIG. 3 is an explanatory diagram showing further exemplary positioning of carriers in an embodiment of a transmission apparatus of orthogonal frequency division multiplexing according to the present invention.

Alternatively, as shown in FIG. 3, carriers adjacent to less distorted SP carriers on both sides of the band may be left as C-carriers, and remaining carriers near both ends may be set as D-carriers.

In this way, while the embodiment of the carrier structure according to the present invention has a high degree of freedom, there is a requirement, in any case, that D-carriers include at least the carrier which experiences the largest distortion, or a predetermined number of carriers which experience the next largest distortion should be set to the D-carriers.

Next, a second embodiment of the present invention will be described. It should be first noted that the second embodiment is identical in the carrier structure to the first embodiment, and uses the same carrier structure as any of those shown in FIGS. 1, 2, 3. Also, the second embodiment is identical to the first embodiment in that C-carriers are modulated in accordance with the synchronous modulation scheme such as the 64 QAM scheme for transmission.

However, the second embodiment differs from the first embodiment in that D-carriers are modulated in accordance with a synchronous modulation scheme with a lower number of multilevel than that of the synchronous modulation scheme for use in modulation of C-carriers, such as QPSK, 16 QAM or 32 QAM scheme. The number of multilevel refers to a numerical value such as 16, 32, 64 in 16 QAM, 32 QAM, 64 QAM or the like.

With the OFDM scheme, as the number of multilevel for the synchronous modulation scheme is higher, the scheme is more susceptible to noise and distortions in reference signal vectors, and therefore, QPSK, 16 QAM, 32 QAM and 64 QAM are more immune, in this order, to noise and distortions in reference signal vectors.

From the foregoing, particularly largely distorted carriers are removed from C-carriers modulated in accordance with a synchronous modulation scheme with a higher number of multilevel, susceptible to noise and distortions in reference signal vectors, and mapped to D-carriers, likewise in the second embodiment. Consequently, as compared with the prior art which includes information codes decoded from carriers using largely distorted reference signal vectors, this embodiment can reduce a code error rate of information codes decoded from C-carriers modulated in accordance with the synchronous modulation scheme.

Also, in the second embodiment, the D-carriers are modulated in accordance with a synchronous modulation scheme with a lower number of multilevel, relatively immune to noise and distortions in reference signal vectors, even if this is the same synchronous modulation scheme as that used for modulating C-carriers. Therefore, a large distortion in a reference signal vector for this carrier, if any, would not cause a significant increase in the error rate of a decoded information code, as compared with the case where this carrier is set to a C-carrier, thereby making it possible to decode a satisfactory information code.

It should be noted that the second embodiment requires a demodulator circuit of a modulation scheme different from a demodulator circuit adapted to a modulation scheme for C-carriers in a intermediate region of the band in order to demodulate D-carriers in end regions of the band. However, when the carriers in the end regions of the band are modulated in accordance with the same synchronous modulation scheme, the same circuit can be shared only by changing signal point positioning for the demodulator circuit, so that an increase in circuit scale can be substantially ignored.

Though description is omitted for the contents of information codes transmitted by the D-carriers and the high degree of freedom in the carrier structure since these aspects are identical both in the second embodiment and the first embodiment, the carrier structure according to the second embodiment can sufficiently reduce the code error rate of information codes decoded from carriers modulated in accordance with the synchronous modulation scheme, as is the case with the first embodiment.

Next, an embodiment of a specific circuit configuration for a digital modulation signal transmission system according to the present invention, which can implement the signal positioning illustrated in FIGS. 1–3 in the first and second embodiments, will be described with reference to block diagrams of FIGS. 4, 5.

Figure 4:
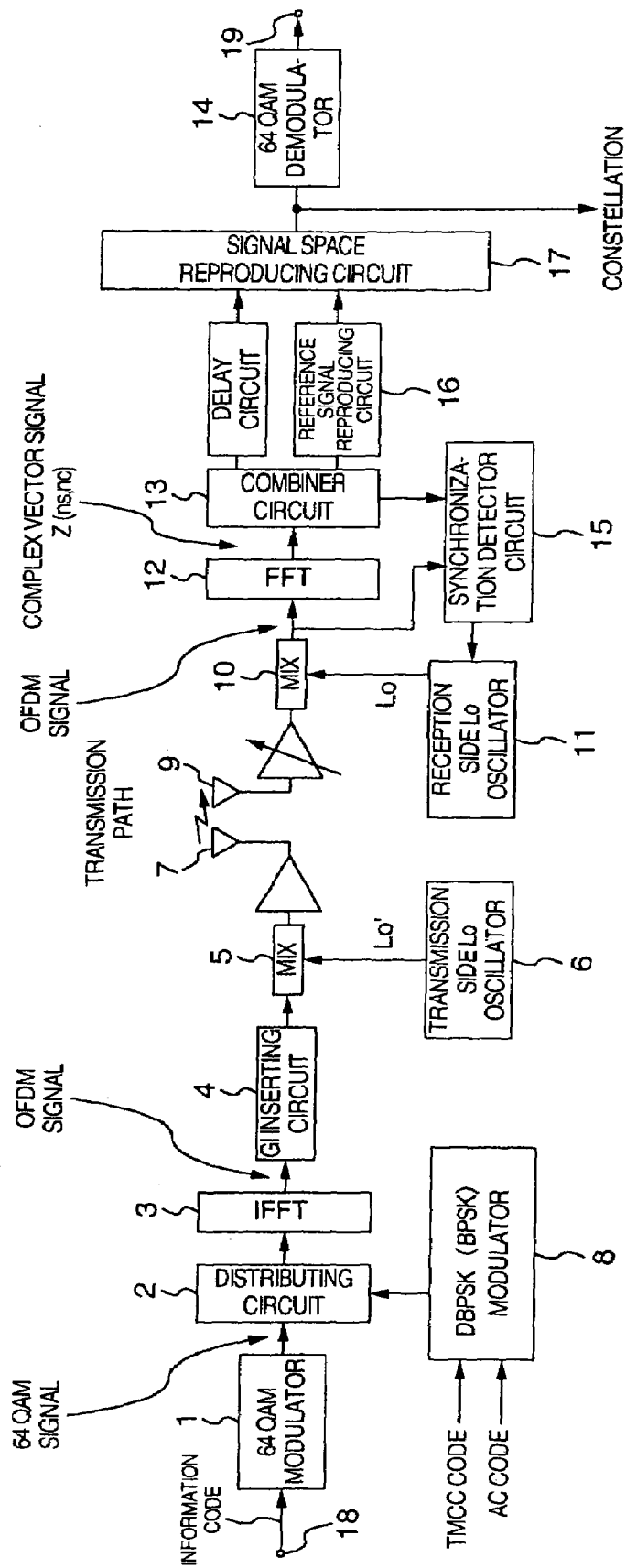
FIG. 4 is a block diagram illustrating an exemplary OFDM-based transmission system to which the present invention is applied.
Figure 8:
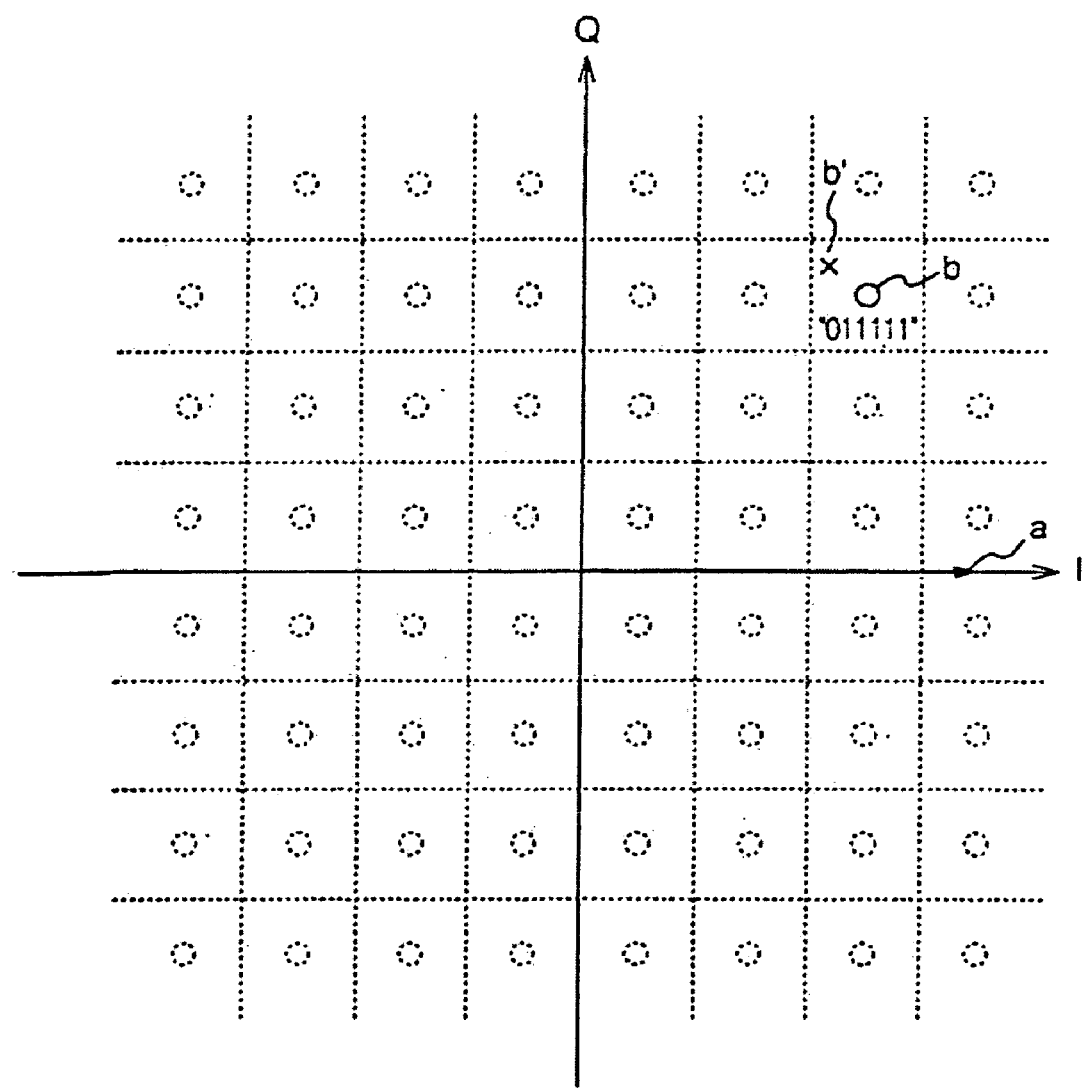
FIG. 8 is an explanatory diagram for positioning of signal points in the 64 QAM scheme.
Figure 9:
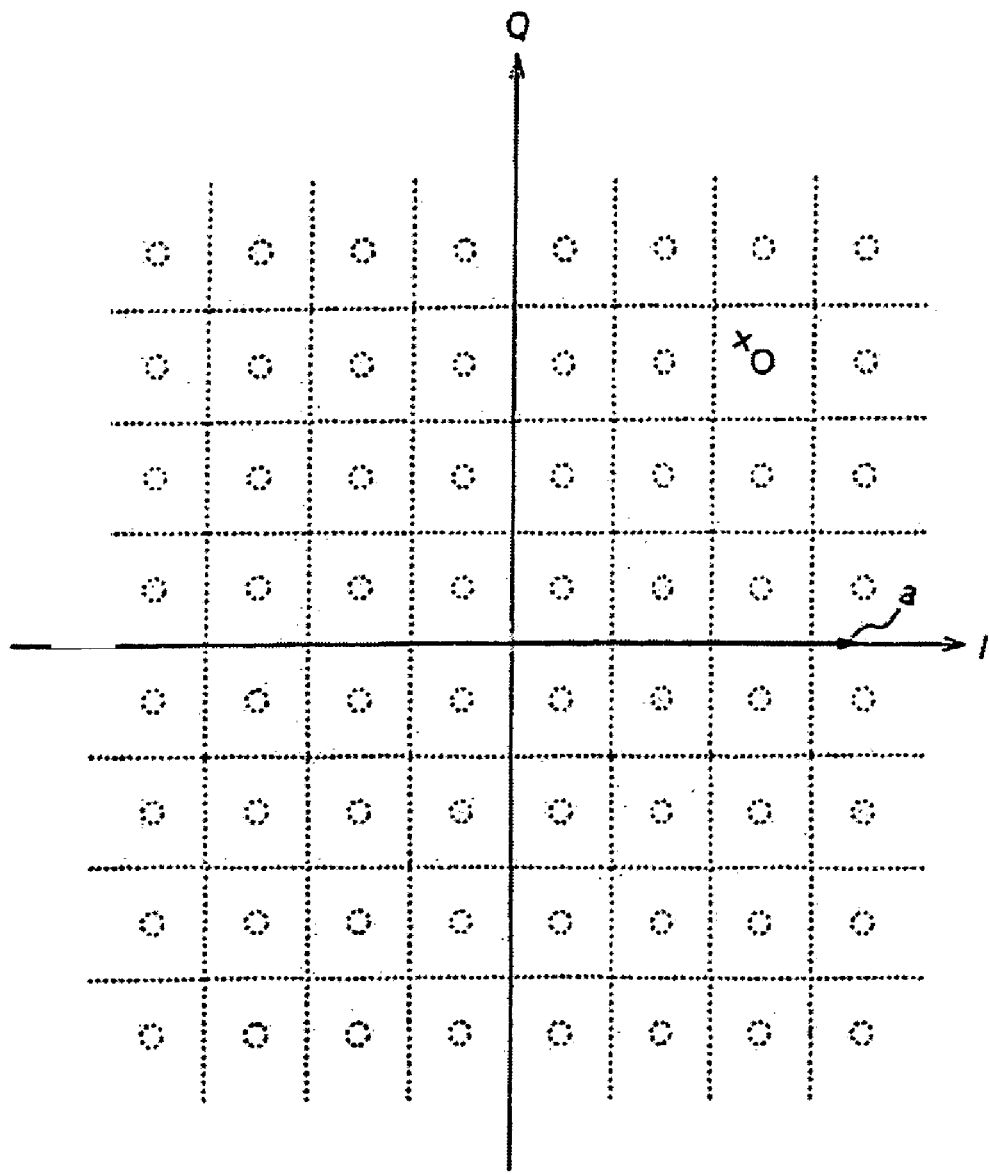
FIG. 9 is an explanatory diagram for rotation of the phase of a reference signal vector in a received signal.
Figure 10:
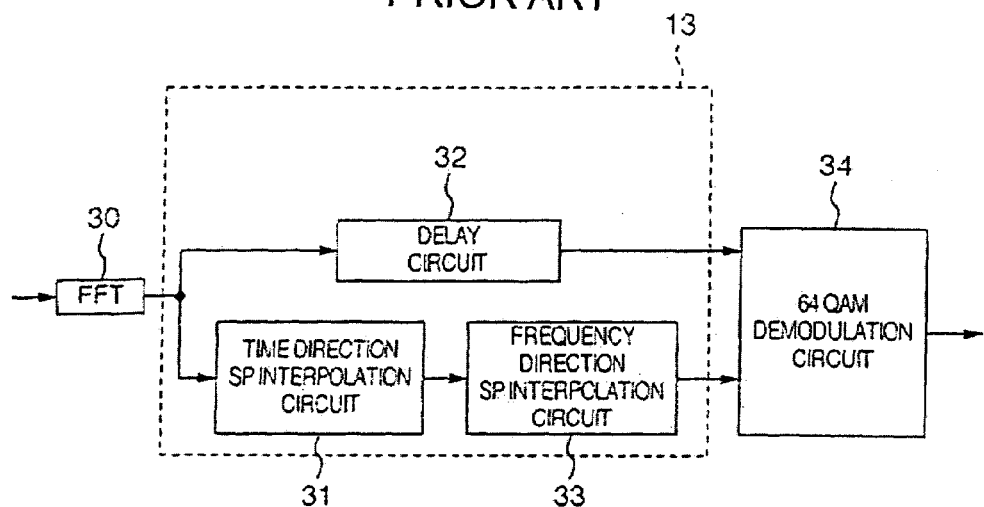
FIG. 10 is a block diagram illustrating an. exemplary circuit used for reproducing a reference signal vector in a prior art OFDM system.
Figure 11:
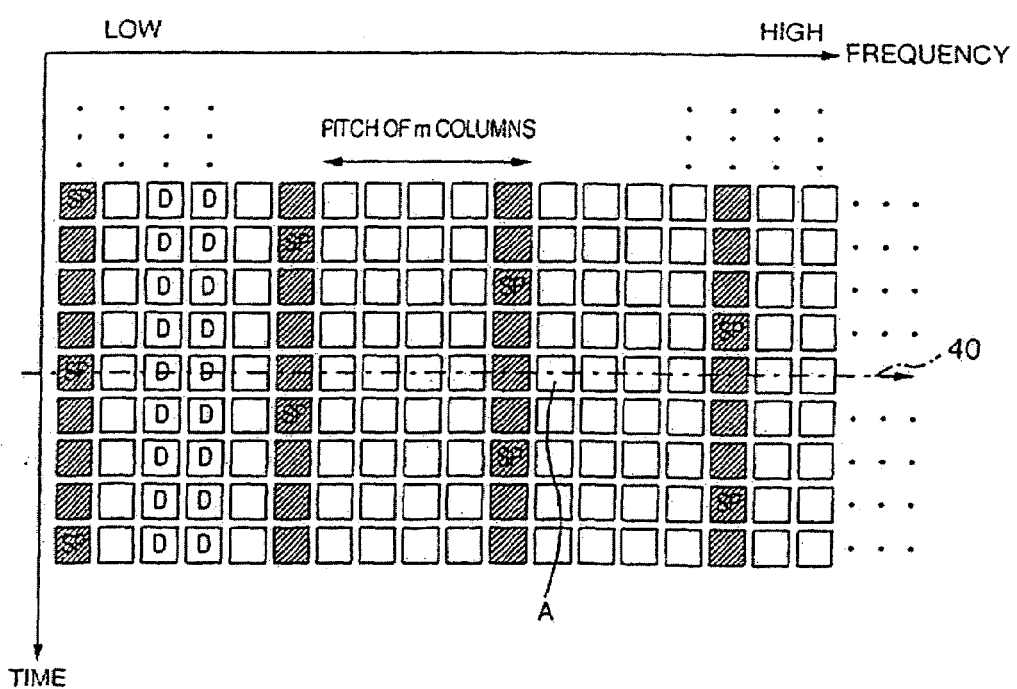
FIG. 11 is an explanatory diagram showing exemplary positioning of carriers employed in a terestrial digital broadcasting system.

FIG. 4 is a basic block diagram of an OFDM-based transmission apparatus to which the present invention is applied. FIG. 5 is a block diagram illustrating the internal configuration of a modulator circuit 1, a distributing circuit 2, and a modulator circuit 8. In the transmission apparatus, information codes are applied to an input terminal 18, and an error correction coding circuit 50 in the 64 QAM modulator circuit 1 converts the information codes to a ¾ convolutional codes. Then, a modulation circuit 51 modulates the information code applied with the error correction to a complex vector signal of 64 QAM scheme. This modulation processing involves dividing a sequence of the input information codes in units of six bits, assigning the divided 6-bit codes to the 64 signal points on the I-Q complex plane as shown in FIG. 8, and outputting a 64 QAM modulated signal (complex vector signal) corresponding to the code.

The distributing circuit 2 distributes 64 QAM modulated signals to a plurality of different carriers. Further, the other modulator circuit 8 modulates pilot signals (SP) as well as a TMCC signal and an AC signal, which are auxiliary signals, in accordance with the BPSK or DBPSK scheme, and inputs the modulated auxiliary signals (complex vector signals) to the distributing circuit 2. The AC signal is an error correction code in the error correction coding circuit 52, and inputted to the modulation unit 51. The distributing circuit 2 switches a switching unit 54 in accordance with a distributing table stored in a ROM 53 contained therein to map a 64 QAM modulated signal, which is a main information signal, the pilot signals (SP) from the modulator circuit 8, and signals modulated with the auxiliary signals such as the TMCC signal and AC signal to respective carriers so as to result in the carrier positioning as shown in FIG. 1, 2 or 3. The distributing table has written therein data that indicates which signal is distributed to which carrier. For example, the auxiliary signals can be assigned to the D-carriers, while the main information code to the C-carriers. The functionality of the switching unit 54 may be implemented by a logic circuit or software. Thus, components of an existing transmission system can be utilized except for the setting of the distributing table, so that addition of special circuits or modification in performance is not required. In addition, since the pilot signals are determined signals, the modulator circuit 8 is provided with a circuit for generating and modulating the pilot signals.

A plurality of modulated carriers outputted from the distributing circuit 2 is applied with inverse discrete fast Fourier transform (IFFT) in an IFFT (Inverse Fast Fourier Transform) circuit 3. With this transform, a 64 QAM signal is transformed into a baseband OFDM signal, multiplexed in accordance with the OFDM scheme, which is comprised of 1,400 carriers that have a symbol period of a time interval Ts', and are spaced by a frequency interval fs from each other and orthogonal to one another. Subsequently, a guard interval inserting circuit 4 adds a guard interval to the OFDM signal. This guard interval is inserted to increase the immunity to multipath fading. However, since this aspect is not related directly to the present invention, detailed description thereon is omitted.

The OFDM signal with the guard interval added thereto is further inputted to a mixer 5 which multiplies the OFDM signal by a high frequency transmission side local oscillating signal Lo' generated by a transmission side Lo oscillator 6 for frequency conversion into a signal in a high radio frequency band. Then, the resulting signal is amplified the power and transmitted from the transmission antenna 7.

On the other hand, at a reception apparatus, a received signal received by a reception antenna 9 is amplified, and then inputted to a mixer 10 which multiplies the received signal by a reception side local oscillating signal Lo generated by a reception side Lo oscillator 11 for frequency conversion, to reproduce a multiplexed baseband OFDM signal. The OFDM signal is further discrete fast Fourier transformed (FFT) in an FFT circuit 12, and separated into complex vector signals Z(ns, nc) of the basebands of the respective carriers, where ns represents a symbol number of the received signal, and nc represents a carrier number of a separated carrier.

The separated complex vector signals Z(ns, nc) of the respective carriers are classified into a 64 QAM signal, a pilot signal, a TMCC signal, an AC signal and so on in a combiner circuit 13 in a process reverse to that in the distributing circuit 2. Among these signals, the pilot signal is inputted to a reference signal reproducing circuit 16 to reproduce a reference signal vector. The reproduced reference signal vector is inputted to a signal space reproducing circuit 17 together with all the signals, which have been delayed by a time required for the reference signal reproducing operation, to reproduce the signal space coordinates in FIG. 8. The signals on signal points at coordinates in the reproduced signal space are inputted to a 64 QAM demodulator circuit 14 which demodulates the 64 QAM signal and decodes convolutional codes, and outputs from an output terminal 19 the results as information codes.

Next, a third embodiment of the present invention will be described. It should be first noted that the third embodiment is identical in the carrier structure to the first and second embodiments, and uses the same carrier structure as any of those shown in FIGS. 1, 2, 3. Also, carriers are classified into C-carriers and D-carriers in the same manner.

However, the third embodiment differs from the first and second embodiments in that an error correction code added to information codes classified as transmitted by C-carriers is different in the correcting performance from an error correction code added to information codes classified as transmitted by D-carriers.

Specifically, the correcting performance of the error correction code for use with the information codes transmitted by the D-carriers is higher than the correcting performance of the error correction code for use with the information codes transmitted by the C-carriers. For example, a ¾ convolutional code is used for the error correction code associated with the information codes transmitted by the C-carriers, while a ½ convolutional code which has higher correcting performance than the ¾ convolutional code is used for the error correction code for use with the information codes transmitted by the D-carriers.

Therefore, in the third embodiment, carriers likely to suffer from particularly large distortions are also removed from the C-carriers, susceptible to noise and distortions in reference signal vectors, for which an error correction code having lower correcting performance is used. Consequently, as compared with the prior art which includes information codes decoded from carriers using largely distorted reference signal vectors, the third embodiment can reduce the code error rate of information codes decoded from carriers modulated in accordance with the synchronous modulation scheme.

On the other hand, an error correction code having higher error correcting performance than the error correction code for use with the information codes transmitted by the C-carriers is added to the information codes transmitted by the D-carriers, so that satisfactory information codes can be decoded because errors, even if occurring in the decoded information codes, can be corrected at a high probability.

Likewise, in the third embodiment, though description is omitted for the contents of information codes transmitted by the D-carriers and the high degree of freedom in the carrier structure since these aspects are identical both in the third embodiment and the first embodiment, the carrier structure according to the third embodiment can sufficiently reduce the code error rate of information codes decoded from carriers modulated in accordance with the synchronous modulation scheme, as is the case with the first embodiment.

Figure 5:
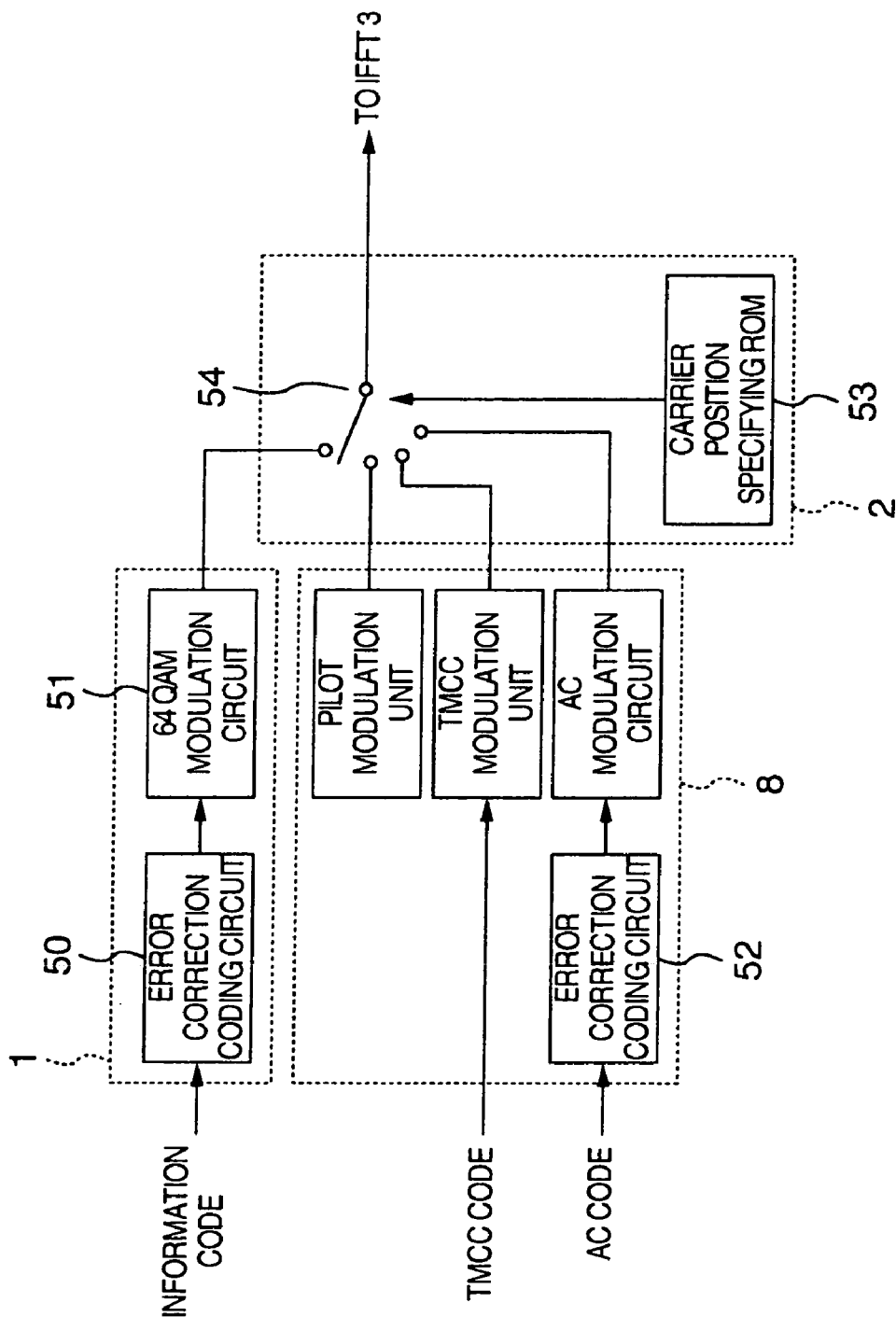
FIG. 5 is a block diagram illustrating an exemplary circuit for mapping each signal to a predetermined carrier.
Figure 6:
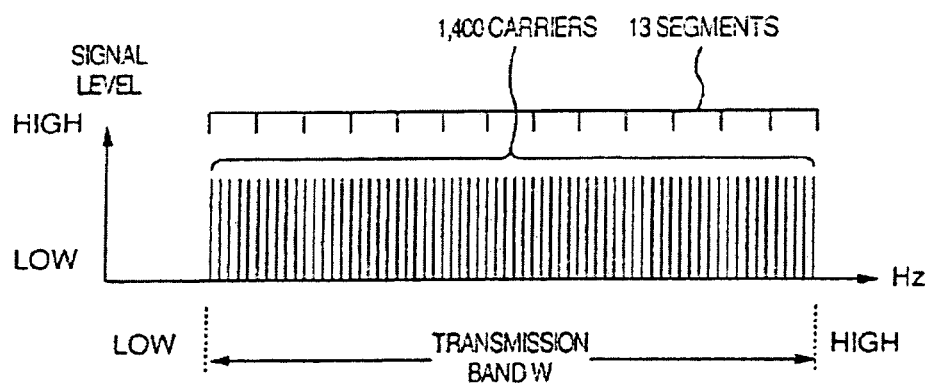
FIG. 6 is an explanatory diagram showing an exemplary structure of carriers employed in a terrestrial digital broadcasting scheme.

In a specific implementation of the third embodiment, for example, as illustrated in FIG. 5, the error correction coding circuit 50 associated with information codes transmitted by C-carriers uses a ¾ convolutional code for the error correction code, while the error correction coding circuit 52 associated with an AC code transmitted by a D-carrier uses a ½ convolutional code, which has higher error correcting performance than the ¾ convolutional code for use with the information codes transmitted by the C-carriers, for the error correction code.

Though not particularly noted in the foregoing description, the value of the predetermined number M for defining the width of a boundary region of ends of the signal transmission band may be determined from an S/N (Signal to Noise) ratio for a distortion of the interpolation filter, and a C/N (Carrier to Noise) ratio which should be required in 64 QAM, assuming, for example, the modulation in accordance with 64 QAM, in which case approximately five times the SP carrier interval is derived from these ratios.

Also, while the foregoing embodiments have all been described only for the case where pilot signals are intermittently inserted as SP in the time direction, it is obvious that the present invention can be applied as well to a carrier structure in which the pilot signals are inserted continuously in the time direction and the interpolation is not required in the time direction.

It should be noted that the present invention provides for more precise signal reproduction by using a modulation scheme as described above for carriers in both end regions (lower frequency side and higher frequency side) of the transmission frequency band, which is different from a modulation scheme used for other carriers, or by using a different error correction code for those carriers. However, the same effect can be produced even if the present invention is applied only to one end region (lower frequency side or higher frequency side) of the transmission frequency band.

According to the present invention, the code error rate can be sufficiently reduced for information codes decoded from carriers which are modulated in accordance with the synchronous modulation scheme because of the disuse of codes decoded by carriers reproduced from largely distorted reference signal vectors, thereby making it possible to readily provide an OFDM-based transmission apparatus using the mult-carrier modulation scheme without requiring an increase in circuit scale.

What is claimed is:

1. A transmission apparatus, of orthogonal frequency division multiplexing for multiplexing a plurality of carriers orthogonal to one another for transmitting signals having a transmission band, including a transmission side and a reception side, said transmission side comprising:
   an input terminal to which said signals are applied;
   a first modulator coupled with said input terminal for outputting first signals which are main information code signals modulated in accordance with a first modulation scheme;
   a second modulator for outputting second signals which are auxiliary signals modulated in accordance with a second modulation scheme; and
   a transmission unit including a distributing circuit coupled with said first and second modulators, said distributing circuit distributing said first and second signals modulated by said first and second modulators to a plurality of predetermined carriers, respectively, so that said second signals are arranged at the positions of all or some of said plurality of predetermined carriers existing within a limited number of carriers close to at least one of both lower and upper ends of said transmission band, and said first signals are arranged at the positions of all or some of the remaining carriers other than said limited number of carriers of said transmission band, and outputting the modulated signals.

2. An apparatus according to claim 1, wherein said second signals are arranged at the positions of all or some of said plurality of carriers existing within a predetermined number of carriers from said respective ends on the lower frequency side and on the higher frequency side of said transmission band.

3. A transmission apparatus, of orthogonal frequency division multiplexing for multiplexing a plurality of carriers orthogonal to one another for transmitting signals, having a transmission band including a transmission side and a reception side, said transmission side comprising:
   an input terminal to which said signals are applied;
   a first modulator coupled with said input terminal for outputting first signals which are main information code signals modulated in accordance with a first modulation scheme;
   a second modulator for outputting second signals which are auxiliary signals modulated in accordance with a second modulation scheme; and
   a transmission unit including a distributing circuit coupled with said first and second modulators for distributing said first and second signals modulated by said first and second modulators to a plurality of predetermined carriers, respectively, so that said second signals are arranged at the positions of all or some of said plurality of predetermined carriers existing within a limited number of carriers close to at least one of both lower and upper ends of said transmission band, and said first signals are arranged at the positions of all or some of the remaining carriers other than said limited number of carriers of said transmission band, and outputting the modulated signals,
   wherein said second modulator further outputs pilot signals and said plurality of carriers distributed with said second signals modulated by said second modulator are some or all of carriers except for carriers used for reproducing reference signal vectors in accordance with said pilot signals for use in demodulating said first signals of carriers modulated in accordance with said first modulation scheme.

4. An apparatus according to claim 3, wherein said second modulation scheme in said second modulator is a differential modulation scheme.

5. An apparatus according to claim 3, wherein said second modulation scheme in said second modulator is a modulation scheme having a smaller number of multilevels than a number of multilevels in said first modulation scheme.

6. An apparatus according to claim 5, wherein said second modulation scheme in said second modulator is one of QPSK, 16 QAM and 32 QAM schemes.

7. A transmission apparatus of orthogonal frequency division multiplexing for transmitting signals having a transmission band, said transmission apparatus comprising:
   a first error correction coding circuit for converting a first code to a first error correction code;
   a second error correction coding circuit for converting a second code to a second error correction code which has error correcting performance higher than said first error correction code;
   a first modulator for outputting first signals which are main information code signals modulated with said first error correction code in accordance with a first modulation scheme;
   a second modulator for outputting second signals which are auxiliary signals modulated with said second error correction code in accordance with a second modulation scheme; and
   a distributing circuit for distributing said first and second signals modulated by said first and second modulators to a plurality of predetermined carriers, respectively, so that said second signals are arranged at the positions of all or some of said plurality of predetermined carriers existing within a limited number of carriers close to at least one of both lower and upper ends of said transmission band, and said first signals are arranged at the positions of all or some of the remaining carriers other than said limited number of carriers of said transmission band.

8. An apparatus according to claim 7, wherein said second signals are arranged at the positions of all or some of said plurality carriers existing within a predetermined number of carriers from said respective ends on the lower frequency side and on the higher frequency side of said transmission band.

9. A transmission apparatus of orthogonal frequency division multiplexing for transmitting signals having a transmission band, said transmission apparatus comprising:
   a first error correction coding circuit for converting a first code to a first error correction code;
   a second error correction coding circuit for converting a second code to a second error correction code which has error correcting performance higher than said first error correction code;
   a first modulator for outputting first signals which are main information code signals modulated with said first error correction code in accordance with a first modulation scheme;
   a second modulator for outputting second signals which are auxiliary signals modulated with said second error correction code in accordance with a second modulation scheme; and
   a distributing circuit for distributing said first and second signals modulated by said first and second modulators, to a plurality of predetermined carriers, respectively, so that said second signals are arranged at the positions of all or some of said plurality of predetermined carriers existing within a limited number of carriers close to at least one of both lower and upper ends of said transmission band, and said first signals are arranged at the positions of all or some of the remaining carriers other than said limited number of carriers of said transmission band,
   wherein said second modulator further outputs pilot signals and said plurality of carriers distributed to said second signals modulated by said second modulator are some or all of carriers except for carriers used for reproducing reference signal vectors in accordance with said pilot signals for use in demodulating said first signals of carriers modulated in accordance with said first modulation scheme.

10. An apparatus according to claim 9, wherein said second error correction code is a ½ convolutional code when said first error correction code is a ¾ convolutional code.

11. A transmission/reception system, of orthogonal frequency division multiplexing, having a transmitter for transmitting signals having a transmission band and a receiver for receiving and demodulating said signals,
   wherein said transmitter comprises:
   a first modulator for outputting first signals which are main information code signals modulated in accordance with a first modulation scheme;
   a second modulator for outputting second signals which are auxiliary signals modulated in accordance with a second modulation scheme; and a distributing circuit for distributing said first and second signals modulated by said first and second modulator to a plurality of predetermined carriers, respectively, so that said second signals are arranged at the positions of all or some of carriers existing within a limited number of carriers close to at least one of both lower and upper ends of said transmission band, and said first signals are arranged at the positions of all or some of the remaining carriers other than said limited number of carriers of said transmission band.

12. A transmission/reception system, of orthogonal frequency division multiplexing, having a transmitter for modulating a plurality of carriers with a plurality of signals to transmit the signals having a transmission band, and a receiver for receiving and demodulating said signals, wherein said transmitter comprises:

a first error correction coding circuit for converting a first code to a first error correction code;

a second error correction coding circuit for converting a second code to a second error correction code which has error correcting performance higher than said first error correction code;

a first modulator for outputting first signals which are main information code signals modulated with said first error correction code in accordance with a first modulation scheme;

a second modulator for outputting signals which are auxiliary signals modulated with said second error correction code in accordance with a second modulation scheme; and a distributing circuit for distributing said first and second signals modulated by said first and second modulators to a plurality of predetermined carriers, respectively, so that said second signals are arranged at the positions of all or some of said plurality of predetermined carriers existing within a limited number of carriers close to at least one of both lower and upper ends of said transmission band, and said first signals are arranged at the positions of all or some of the remaining carriers other than said limited number of carriers of said transmission band.

13. An apparatus according to claim 1, wherein said first modulation scheme is a synchronous modulation scheme and said second modulation scheme is a differential modulation scheme.

14. An apparatus according to claim 13, wherein said second modulation scheme is one of DBPSK, DQPSK, 8 DPSK and 16 DAPSK schemes.

15. An apparatus according to claim 1, wherein said second modulation scheme in said second modulator is a modulation scheme having a smaller number of multilevel than a number of multilevel in said first modulation scheme in said first modulator which can be applied with the synchronous detection.

16. An apparatus according to claim 15, wherein said second modulation scheme in said second modulator is one of QPSK, 16 QAM and 32 QAM schemes.

17. An apparatus according to claim 16, wherein said first modulation scheme in said first modulator is 64 QAM.

18. An apparatus according to claim 6, wherein said first modulation scheme in said first modulator is 64 QAM.

* * * * *